June 17, 1930.                G. E. STOLTZ                1,764,365
                              SERIES EXCITER
                            Filed Dec. 13, 1927
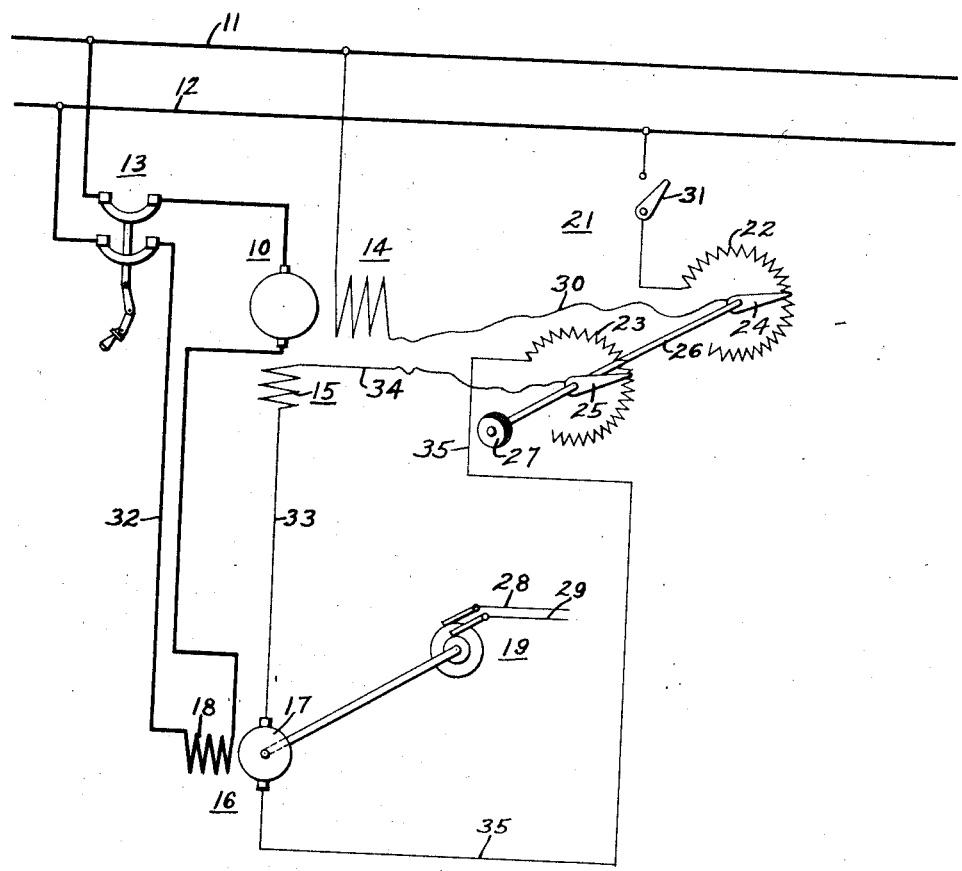
INVENTOR
Glenn E. Stoltz
BY
                ATTORNEY Patented June 17, 1930

1,764,365

UNITED STATES PATENT OFFICE

GLENN E. STOLTZ, OF WILKINSBURG, PENNSYLVANIA, ASSIGNOR TO WESTINGHOUSE ELECTRIC & MANUFACTURING COMPANY, A CORPORATION OF PENNSYLVANIA

SERIES EXCITER

Application filed December 13, 1927. Serial No. 239,659.

This invention relates generally to control systems and more particularly to control systems for electric motors such as may be employed to drive rolling mills.

The object of the invention, generally stated, is to provide a control system for rolling mill motors which shall be simple and efficient in operation.

A more specific object of the invention is to provide for controlling the speed of a motor by varying the energization of the field windings, to obtain a constant speed under varying loads.

A further object of the invention is to provide for simultaneously varying the energization of an auxiliary or compounding field winding and a shunt field winding of an electric motor.

A further object of the invention is to provide for maintaining the speed of a variable speed motor at a constant value from no load to full load throughout the entire operating speed range of the motor.

In rolling mill work, and especially in the operation of tandem operated finishing mills which are used extensively in the rolling of metal strip which may be, for example, from 100 to 300 feet in length and of relatively small cross sectional area, it is desirable to provide an adjustable speed motor having a wide speed range. Usually the ratio is about 3 to 1, or even greater. Furthermore, it is highly important that the motors which are employed to drive the various sets of rolls in the tandem mill, through which a continuous piece of metal is passed, operate at practically a constant speed from no load operation to full load operation. This operating condition is necessary in order to maintain a certain predetermined speed of the rolls, so that there will be no straining or buckling action imposed upon the metal as it passes successively through the several sets of rolls.

The most desirable type of motor for application to rolling mills of this type is one having a flat speed characteristic or, in other words, a flat compounded motor.

The method of flat compounding of direct current motors, is well understood by those skilled in the art and in general the usual practice is to provide a sufficient number of ampere turns in the series or compounding field winding to counteract any magnetic influences set up in the motor by the current in the armature conductors, which may have a weakening or a strengthening effect upon the magnetic field produced by the shunt field winding and thus automatically cause variations in the operating speed as different loads are imposed upon the motor.

In practice, it has been found that armature reaction and other similar magnetic influences which occur in all types of direct current motors make it difficult for the designer to build motors which will operate at practically a constant speed for any predetermined speed setting within their range of speed.

It is well known that variation in speed of a shunt or compound-wound motor may be obtained by varying the strength of the shunt field. However, good speed regulation depends largely upon the relative strengths of the shunt and compounding fields of a compound-wound motor and therefore the compounding effect of an ordinary series field designed to maintain constant speed for any specific speed setting, for example, 150 R. P. M. will not be suitable for the same motor when the speed is changed to 300 R. P. M. In other words the magnetizing effect of the series field must be different for every speed setting and it also must be varied in accordance with the load on the motor in order to maintain constant operating speeds as variations in loading occur.

Accordingly, in order to overcome the difficulties hereinbefore referred to, a shunt-wound motor provided with an auxiliary or compounding field winding is utilized, and means are provided, whereby the energization of both the shunt and the auxiliary or compounding field windings are simultaneously controlled. Also, means are provided for automatically controlling the degree of the energization of the auxiliary field winding, in accordance with the load current of the motor, when the motor is operating at any preselected speed within its operating range.

For a more comprehensive understanding of the invention, reference may be had to the accompanying drawing, in which the single figure is a diagrammatic view of the apparatus and control circuits arranged in accordance with the present invention.

Referring now to the drawing, a compound motor 10 suitable for driving any device such as the rolls of a steel mill at a constant speed, is shown connected across a source of direct current supply which, in this instance, is the line conductors 11 and 12. A line switch 13 is interposed between the power source and the motor.

The motor 10 is provided with a separately excited shunt field winding 14 and an auxiliary or compounding field winding 15. In order to energize the auxiliary field winding 15, an exciter 16 having an armature 17 and field winding 18 is provided. As shown, the exciter 16 is disposed to be driven at a constant speed by a suitable type of motor 19.

For the purpose of controlling the current flowing in the field windings 14 and 15 of the motor 10, a rheostat 21 comprising resistor elements 22 and 23 is provided. In the interest of clearness in illustration, the rheostat is shown in its simplest form, in which the movable contact arms 24 and 25 are rigidly secured to a common shaft 26, which may be rotated by the knob 27 to effect the simultaneous control of the resistor elements.

In order that the features and functioning of the invention may be more fully understood, the operation of the system will now be explained in detail.

The constant speed motor 19 which drives the exciter 17 may be operated from any suitable source of power, such, for example, as the power line comprising the line conductors 28 and 29. Therefore, it may be assumed that the motor 19 will drive the exciter 16 at a substantially constant speed.

In order to establish an energizing circuit for the shunt field winding 14, the switch 31 is closed. Current then flows from the positive line conductor 11 through the shunt field winding 14, conductor 30, resistor 22, and the switch 31 to the negative line conductor 12.

In this embodiment of the invention, a line switch 13 is provided for connecting the motor 10 to the power line. When the switch 13 is closed, a motor circuit is established which extends from the positive conductor 11 through the upper contact members of the line switch 13, armature of the motor 10, field winding 18 of the exciter 16, conductor 32 and the lower contact members of the line switch 13 to the negative line conductors 12.

It will be observed that the exciter field winding 18 is connected in series with the motor and since the exciter 16 is operated at a substantially constant speed, it will generate a voltage which will vary directly as the load current of the motor 10.

As can be readily understood, the speed of the motor 10 may be controlled by the shunt field resistor 22 which may be adjusted to obtain the desired operating speed of the motor.

In order to maintain the speed of the motor 10 substantially constant when its load varies, provision is made for energizing the auxiliary or compounding field winding 15 from the exciter 16, the voltage of which varies with the load and thereby causing the magnetic field of the motor to change with variations in load. The compounding field circuit may be traced from the exciter 16, through conductor 33, field winding 15, conductor 34, movable contact member 25, resistor 23, conductor 35, to the exciter 16.

If it is desired to change the operating speed of the motor 10 for any reason, it may be accomplished by rotating the movable contact member 24 of the rheostat 21 in either a clockwise or a counter-clockwise direction to weaken or strengthen the shunt field of the motor 10. For example, if the movable contact member 24 is rotated in a clockwise direction until the speed of the motor is doubled, the strength of the shunt field will be reduced to substantially 50% of its previous strength. In order to provide for maintaining the speed of the motor substantially constant when operating at the increased speed under varying load conditions, the strength of the auxiliary or compounding field is also varied at the same time the shunt field is varied. In this instance the movable contact member 25 of the rheostat 21 is rigidly secured to the common shaft 26 and is therefore rotated to vary the effective amount of the resistor 23 in the auxiliary field circuit simultaneously with the variation of resistance in the shunt field circuit.

In this way the relative strengths of the shunt and compounding fields are maintained at the desired ratio throughout the entire speed range of the motor 10, which insures that the desired amount of compounding effect will exist for all speeds.

The actual form of control apparatus used for carrying the present invention into effect is not limited to the embodiment described, as it will be readily understood by those who are skilled in the art that various forms of control apparatus may be utilized.

Furthermore, while the invention has been explained and described with special reference to rolling mills, it will be obvious that the principle embodied therein is applicable to other machines which are similar.

Since certain changes may be made in the above-described construction, and different embodiments of the invention may be made without departing from the scope thereof, it

I claim as my invention:

1. In a motor-control system, in combination, a motor provided with shunt and auxiliary field windings, a source of power for the motor, means for connecting the shunt field winding to the source of power, an exciter for energizing the auxiliary field winding, a constant-speed motor for driving the exciter and means for simultaneously varying the degree of the energization of each field winding to change the speed of the motor and the degree of compounding provided by the auxiliary field winding.

2. In a motor-control system, in combination, a motor provided with shunt and auxiliary field windings, a source of power for the motor, means for energizing the shunt field winding from the source of power, an exciter for energizing the auxiliary field winding in accordance with the load on the motor and means for varying the excitation of the shunt and auxiliary field windings in the same proportion to vary the speed of the motor and to render the exciter effective to maintain said speed regardless of load variation.

3. In a motor-control system, in combination, a motor provided with main and auxiliary windings, a source of power for the motor, an exciter provided with a field winding for energizing the auxiliary field of the motor, the exciter field being connected in series with the motor, said exciter being responsive to an increase in the load current of the motor to increase the excitation of the motor auxiliary field winding to maintain a substantially constant speed, and means for controlling the excitation of the main and auxiliary field windings simultaneously to vary the motor speed.

4. In a motor-control system, in combination, a motor provided with a main and auxiliary field windings, a source of power for the motor, an exciter provided with a field winding for energizing the auxiliary field of the motor, the exciter field being connected in series with the motor, said exciter being responsive to an increase in the load current of the motor to increase the excitation of the motor auxiliary field winding to maintain the motor speed at any desired value, and means for effecting a predetermined excitation of the main field to give a predetermined speed, said means being disposed to concurrently vary the effect of the auxiliary field.

5. In a motor-control system, in combination, a motor provided with main and auxiliary windings, a source of power for the motor, means for controlling the excitation of the main field to predetermine the motor speed, an exciter driven at a constant speed and provided with a field winding for energizing the auxiliary field of the motor, the field winding of the exciter being connected in series with the motor to cause the generated voltage of the exciter to vary in accordance with the load on the motor to maintain substantially a constant speed throughout its load range for a predetermined speed setting.

6. In a motor-control system, in combination, a motor provided with shunt and auxiliary field windings, a source of power for the motor, means for energizing the shunt field winding, an exciter for energizing the auxiliary field winding having a field winding in circuit with the motor, said exciter being responsive to the load current of the motor to vary the excitation of the auxiliary field winding as the load on the motor varies when operating at any desired speed, a rheostat adapted to vary the resistance of the shunt field circuit to determine the operating speed of the motor, and a second rheostat disposed to be operated concurrently with the first rheostat to vary the resistance of the auxiliary field circuit to change the degree of compounding produced by the auxiliary field winding, thereby to maintain the speed of the motor substantially constant as the load varies.

7. In a motor-control system, in combination, a motor provided with shunt and auxiliary field windings, a source of power for the motor, a constant speed exciter for energizing the auxiliary field winding, the shunt field winding being connected across the source of power, a rheostat comprising a plurality of resistor elements, one resistor element being connected in series with the exciter and auxiliary field winding of the motor, a second resistor element being connected in series with the shunt field winding, and means for simultaneously controlling the two resistor elements to vary the speed of the motor.

8. In a motor-control system, in combination, a motor provided with shunt and auxiliary field windings, a source of power for the motor, a constant speed exciter for energizing the auxiliary field winding, the shunt field winding being connected across the source of power, a variable resistor adapted to control the exciting current in the shunt field winding to change the motor speed, a variable resistor of like character adapted to control the exciting current of the auxiliary field winding to regulate the degree of compounding to a predetermined value to maintain the speed of the motor substantially constant at any speed obtained by varying the exciting current of the shunt field, and means for effecting a simultaneous variation of the two resistors.

9. In a motor-control system, in combination, a driving motor provided with auxiliary and shunt field windings, an exciter connected in series-circuit relation to the auxiliary field winding of the motor, a constant-speed motor for driving the exciter, said exciter having a field winding connected in series with the driving motor, thereby to effect a variation of the exciter voltage in direct proportion to the changes in motor load, means for controlling the excitation of the shunt field winding to vary the motor speed, and means operable in conjunction with said control means for changing the exciting current in the auxiliary field winding without changing the exciter voltage to modify the effect of the shunt field to cause the driving motor to operate at substantially the same speed at full load as at no-load.

In testimony whereof, I have hereunto subscribed my name this 7th day of December, 1927.

GLENN E. STOLTZ.